United States Patent [19]
Strzala

[11] Patent Number: 6,108,927
[45] Date of Patent: Aug. 29, 2000

[54] METHOD AND EQUIPMENT FOR HEATING PARTS COMPRISING HYGROSCOPIC, ELECTRIC INSULATION

[75] Inventor: Helmut Strzala, Braunfels-Bonbaden, Germany

[73] Assignee: Wilhelm Hendrich Vakuumanlagen GmbH & Co., Ehringshausen-Datzenfurt, Germany

[21] Appl. No.: 09/174,406

[22] Filed: Oct. 19, 1998

[30] Foreign Application Priority Data

Oct. 23, 1997 [DE] Germany ............... 197 46 870
Jun. 16, 1998 [DE] Germany ............... 198 26 682

[51] Int. Cl.$^7$ ........................................ F26B 21/06
[52] U.S. Cl. ........................ 34/73; 34/76; 34/79; 34/92
[58] Field of Search .................... 34/72, 77, 78, 34/76, 73, 470, 92, 75, 79

[56] References Cited

U.S. PATENT DOCUMENTS

| | | | |
|---|---|---|---|
| 4,054,431 | 10/1977 | Kotcharian | 55/70 |
| 4,292,744 | 10/1981 | Nabholz | 34/73 |
| 4,424,633 | 1/1984 | Bernhardt et al. | 34/75 |
| 5,539,995 | 7/1996 | Bran | 34/77 |

FOREIGN PATENT DOCUMENTS 0 290 098 B1  11/1990  European Pat. Off. .
196 37 313
       A1   3/1997  Germany .

*Primary Examiner*—Pamela A. Wilson
*Assistant Examiner*—Michelle A. Mattera
*Attorney, Agent, or Firm*—Liniak, Berenato Longacre & White

[57] ABSTRACT

Equipment provides more rapid drying of heating parts comprising hygroscopic, electric insulation made of cellulose and/or plastics. At least two condensers are present, one being used when heating the parts and the other in the distillation stage. As a result removal by distillation is possible any time during heating and during the time intervals when heating is interrupted and the pressure-dropping procedure is carried out in the vacuum vessel. Due to the second condenser (with a second, associated vacuum pump), the heating medium can be cleansed or distilled during the pressure-dropping procedure and simultaneously the suction or drying procedure can be carried out in the vacuum vessel. This feature leads to drying the electrical parts more rapidly than heretofore because the steps of drying the electrical parts and regenerating the heating medium no longer require being consecutive, but instead regeneration can be implemented simultaneously with the evacuation of the vicinity around the electrical parts. By using a two-condenser design and different connecting lines, the versatility of the equipment is substantially increased. For instance the two condensers together with their associated vacuum pumps can be used in parallel for drying to achieve higher drying output and a higher operational rate. However, the two condensers may just as well be used to cleanse the heating medium; in this case they are separate from the vacuum chamber and cool only the heating medium heated by the evaporator and fed through the bypass line.

6 Claims, 4 Drawing Sheets

METHOD AND EQUIPMENT FOR HEATING PARTS COMPRISING HYGROSCOPIC, ELECTRIC INSULATION

FIELD OF THE INVENTION

The invention relates to equipment for heating parts comprising hygroscopic, electric insulation made of cellulose and/or plastics for purposes of vacuum drying.

DESCRIPTION OF RELATED ART

A number of procedures are available to raise the temperature of parts to be dried to a desired level. The present invention concerns a method of vacuum heating by condensing solvent vapor, commonly called the "vapor phase" method. Such a method and corresponding equipment is disclosed in the German patent document Al 196 37 313 of which the disclosure is fully integrated into the object of this application. The parts to be dried therein, foremost paper-insulated electrical parts such as transformers, capacitors, current transformers, power feedthroughs etc., are located inside a vacuum-tight chamber or a vacuum-tight housing. The water leached into the paper on account of atmospheric humidity must be removed before the paper insulation is impregnated with transformer oil to raise its breakdown strength. To that end, the implements are heated under vacuum. In the process the water evaporates and is precipitated in the condenser preceding the vacuum pump. The parts are heated to the required drying temperatures by feeding the vapor of a low-boiling liquid, such as kerosene acting as the heating medium, into the chamber. When this vapor condenses on the still colder surfaces of the parts, the released heat of condensation is transferred to these parts and raises their temperature. In case the transformer windings have been pre-impregnated or already have been in use, the insulation furthermore contains oil. Not only water, but also oil will be withdrawn when the insulation is being dried. The draining condensate dissolves the oil absorbed in the parts, or the residual adhering oil occurring in substantial quantities especially when overhauling transformers. In order to reuse the heating fluid, the draining liquid is collected and moved through a feed-pump to an evaporator. Because of the increasing enrichment of the oil of higher boiling point in the heating-medium circuit, the vapor pressure of heating fluid drops. As a result, evaporator efficiency drops and the required temperature no longer is achieved at the parts to be heated. In such a case, the oil must be separated from the circuit of the working medium, for instance kerosene.

The initially cited German patent document Al 196 37 313 describes such apparatus for heating and drying parts fitted with hygroscopic, electrical insulation made of cellulose and/or plastic and comprising a vacuum vessel, a vacuum pump preceded by a condenser and an evaporator for the heating liquid and communicating as needed by a sealable aperture with the vacuum vessel and by a bypass line directly with the condenser. In this manner, the kerosene can already be separated from the transformer oil during heating and with moderate costs in the apparatus.

Furthermore a procedure to extract oil or polychlorinated biphenyl (PCB) from impregnated electrical parts is already known from the European patent document 290 098 B1, whereby the solvent again is distilled from the oil-solvent mixture or from the mixture of PCB and solvent. In this process, the highly volatile solvent is evaporated in a heating phase in a previously evacuated autoclave containing the parts to be cleaned. Thereupon the solvent vapor condenses at the parts to be cleaned that thereby are heated and in this procedure it penetrates the electrical insulation, said vapor leaching the oil or the PCB out of the electrical insulation. The solvent vapor containing oil or PCB is then aspirated from the condenser out of the autoclave using a vacuum pump and is made to condense. Thereafter the two liquids are separated by distillation with the solvent being returned to the evaporator in the autoclave. Several intermediate pressure-dropping stages with a simultaneous distillation stage are present between the heating stages, and during said distillation stage the solvent is distilled from the oil-solvent mixture or PCB-solvent mixture directly out of the autoclave. Simultaneously the solvent supply to the evaporator is shut off and a bypass line is opened to feed the condensate collecting at the autoclave base through a feed pump to the evaporator and in this manner circulates the mixture and distills it in the process. The autoclave is part of the circulation loop in this phase.

SUMMARY OF THE INVENTION

Based on the German patent document Al 196 37 313, the object of the invention is to create such equipment making possible even more efficient and provide more rapid drying of heating parts comprising hygroscopic, electric insulation made of cellulose and/or plastics.

This objective is attained by equipment defined below. At least two condensers are present in the invention, one being used when heating the parts and the other in the distillation stage.

As a result removal by distillation is possible any time during heating and during the time intervals when heating is interrupted and the pressure-dropping procedure is carried out in the vacuum vessel. Because the invention provides a second condenser (with a second, associated vacuum pump), the heating medium can be cleansed or distilled during the pressure-dropping procedure and simultaneously the suction or drying procedure can be carried out in the vacuum vessel. This feature leads to drying the electrical parts more rapidly than heretofore because the steps of drying the electrical parts and regenerating the heating medium no longer require being consecutive, but instead regeneration can be implemented simultaneously with the evacuation of the vicinity around the electrical parts. Obviously too the invention is not restricted to an evaporator outside the vessel, rather it can be implemented in the same manner with equipment of which the evaporator is integrated into the vessel.

A preferred embodiment wherein the condenser for the distillation stage is connected by a pressure barrier to the bypass line and/or a reservoir for the heating medium or a separation vessel, the pressures in the drying vessel and in the distillation circuit can be set to be wholly independent and/or different from one another. For instance the pressure in the vacuum vessel may be set to be optimal for the particular drying stage whereas the pressure in the vacuum vessel is optimally adjusted to the instantaneous loading of the heating medium with volatile substances. The temperatures of the two circuits also may be optimally adjusted as needed and independently from one another.

In a further design of the invention, a bypass line is present between the first condenser and the connecting line used in distillation to the second condenser. As a result, distilling off the transformer oil is also possible during fine drying. By using a two-condenser design and different connecting lines, the versatility of the equipment is substantially increased. For instance the two condensers together with their associated vacuum pumps can be used in parallel for drying to achieve higher drying output and a higher operational rate. However, the two condensers may just as well be used to cleanse the heating medium; in this case they are separate from the vacuum chamber and cool only the heating medium heated by the evaporator and fed through the bypass line.

Further objectives, advantages, features and applications of the invention are elucidated in the following description of illustrative embodiments and in relation to the drawings. All features, whether described and/or shown graphically, whether per se or in arbitrary, meaningful combination, are objects of the present invention, even regardless of the specific terminology set forth herein as shall be understood by those of skill in the art.

DETAILED DESCRIPTION OF THE PREFERRED EMBODIMENTS

Figure 1:
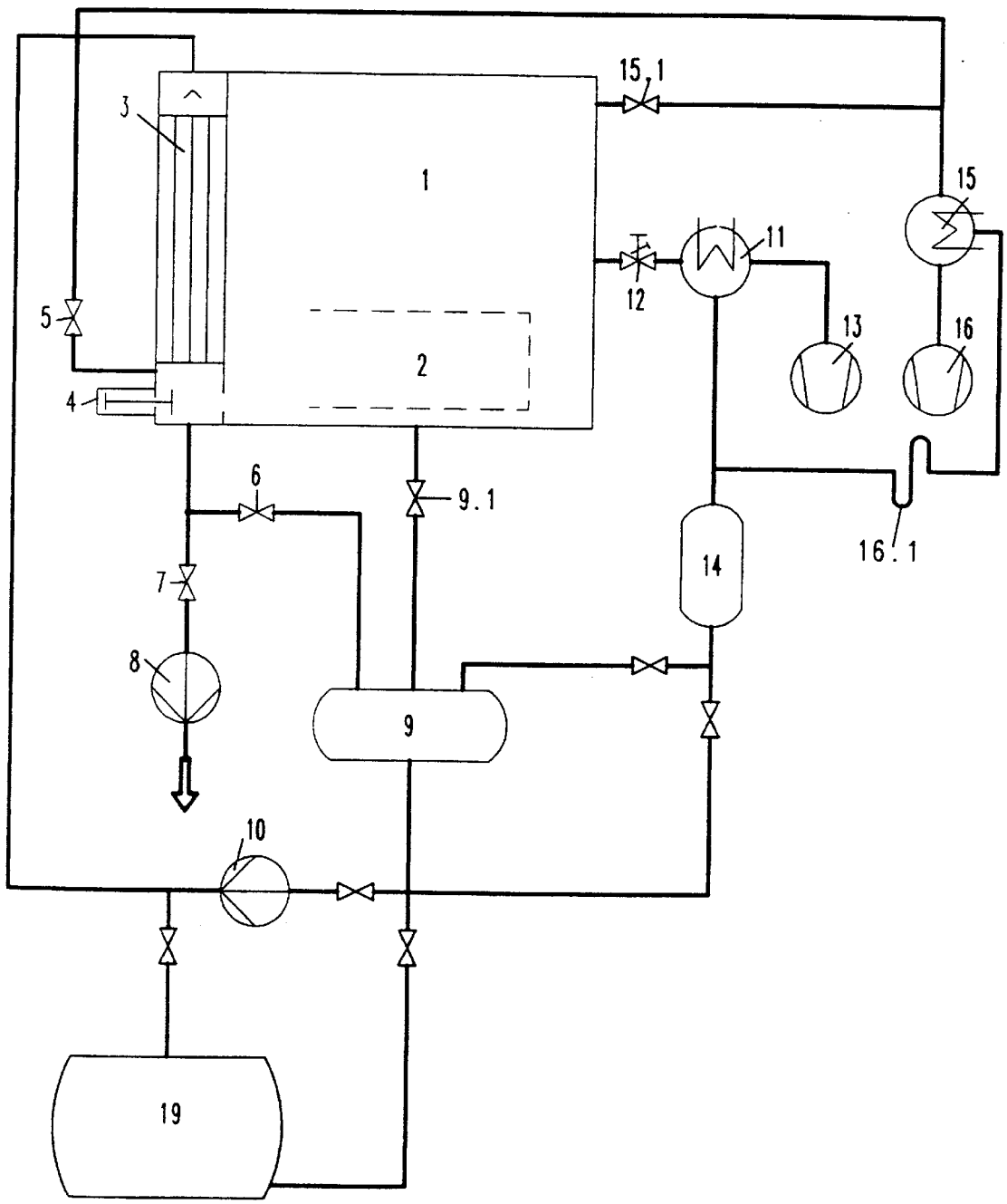
FIG. 1 is a functional block diagram of heating and drying equipment of the invention.

FIG. 1 shows an evacuable vacuum vessel 1 housing parts 2 to be dried, for instance heating parts comprising hygroscopic, electric insulation made of cellulose and/or plastics, e.g. transformers. An evaporator, 3 in this case a falling-film evaporator, for the heating liquid such as kerosene, is connected to the vacuum vessel 1. Obviously a thin-film evaporator also may be used in general. The evaporator 3 is fitted with an aperture which leads to the vacuum vessel 1 and which can be closed by the valve 4. Furthermore the evaporator 3 also can be integrated into the vacuum vessel 1. The vacuum pump 13 is connected through the regulator 12 and the first condenser 11 to the vacuum vessel 1 and the vacuum pump 16 is connected through the valve 15.1 and the second condenser 15 to the vacuum vessel 1. A bypass line which can be turned ON and OFF by the valve 5 also leads to the second condenser 15 and passes from there through the pressure barrier 16.1 to the bypass line and, in this particular embodiment, it terminates between the first condenser 11 and liquid reservoir/separator-vessel 14. In cooperation with the vacuum pump 16 and the condenser 15, the bypass line makes it possible to distill the solvent/oil mixture, whereas the other vacuum pump 13 and the condenser 11 evacuates the vacuum oven and thereby dries and de-oils the insulation. A path of removal for the second liquid of higher boiling point, for instance transformer oil, leads through the valve 7 to the feed-pump 8 or through the valve 6 to the container 9 which collects the condensate draining from the vacuum vessel 1 (through the valve 9.1 ) and the condensate, rid of water, in the liquid reservoir/separation vessel 14, from the condensers 11 and 15. The feed-pump 10 moves the heating liquid to the evaporator 3. The container 19 forms the total kerosene reservoir.

Initially, the vacuum vessel 1 containing the parts to be dried is evacuated by the vacuum pump 16 that is preceded by the condenser 15. In the further drying procedure, water vapor issuing from the parts 2 and leakage air entering the vacuum system are aspirated by the first vacuum pump 13 and the first condenser 11 by means of the regulator 12 constituting a pressure barrier between the vacuum vessel 1 and the first condenser 11.

The evaporator 3 in this embodiment is a falling-film evaporator moving kerosene vapor into the vacuum vessel 1. The kerosene vapor condenses on the surfaces of the parts 2 to which it releases its heat of condensation so that the temperature for the desired drying of the parts 2 is increased. The draining condensate collects in the container 9 and is recycled by the feed-pump 10 into the evaporator 3. At the intake of the evaporator 3, the kerosene is evenly distributed on its tubes and runs downward along the heated tube inside-surfaces. The generated kerosene vapor flows directly into the vacuum vessel 1 and condenses on the parts 2 to be heated. As the temperature of the parts 2 increases, the kerosene vapor pressure also rises in the vacuum vessel 1. As a result, less than the full quantity of kerosene will be evaporated, that is, a portion runs un-evaporated through the evaporation tubes and is returned through the valve 6 and without incurring energy losses to the kerosene circuit.

The water vapor issuing from the insulation together with the leakage air and a portion of the kerosene vapor is aspirated through the vacuum pump 13 and the condenser 11. The kerosene and water vapors condense therein and drain into the liquid reservoir/separation vessel 14 below. The leakage air is aspirated by the vacuum pump 13.

When pre-impregnated coils or active parts of transformers being repaired are heated, then the oil will be rinsed out by the draining kerosene condensate and dissolved in the kerosene. As a result the vapor pressure drops in the kerosene/oil solution moved into the evaporator 3 and the heating rate decreases because of a drop in the pressure gradient between the evaporator 3 and the vacuum vessel 1. In order to continue heating at full efficiency, the transformer oil must be separated from the kerosene. Such a step can be illustratively implemented by closing the valve 4 during the pressure-dropping stages or at the end of heating. The kerosene/oil solution is moved at an adjusted flow into the evaporator 3. Direct connection to the condenser 15 is implemented by opening the valve 5. The kerosene vapor is aspirated out of the evaporator 3, condensed in the condenser 15 and then moves by means of the pressure barrier 16.1 into the liquid reservoir/separation vessel 14. The transformer oil runs un-evaporated downward through the evaporator tubes and is pumped off by means of the feed-pump 8.

Because of the direct connection to the condenser 15, the pressure in the evaporator 3 is lowered almost to the kerosene saturation partial pressure of the condenser 15. This feature allows optimal separation of kerosene and transformer oil. The least residual kerosene concentration in oil essentially depends only on the temperature of the cooling water of the condenser 15 and on the vacuum produced by the vacuum pump 16.

Accordingly, during the time interval between the pressure-dropping stages, the kerosene circuit can be cleansed for instance in synchronized operation without affecting the pressure drops and consequently, when heating is continued, the full evaporator output will be available. Because the invention provides two condensers 11, 15 with their associated vacuum pumps 13, 16, the first condenser 11 may remain connected to the vacuum vessel 1 while the heating medium is cleansed by means of the bypass line and the second condenser 15 and it may withdraw further vapors from the part 2 that were aspirated by the vacuum pump 13 and the condenser 11. The total processing time required in the invention is substantially less than in the equipment of the state of the prior art.

Figure 2:
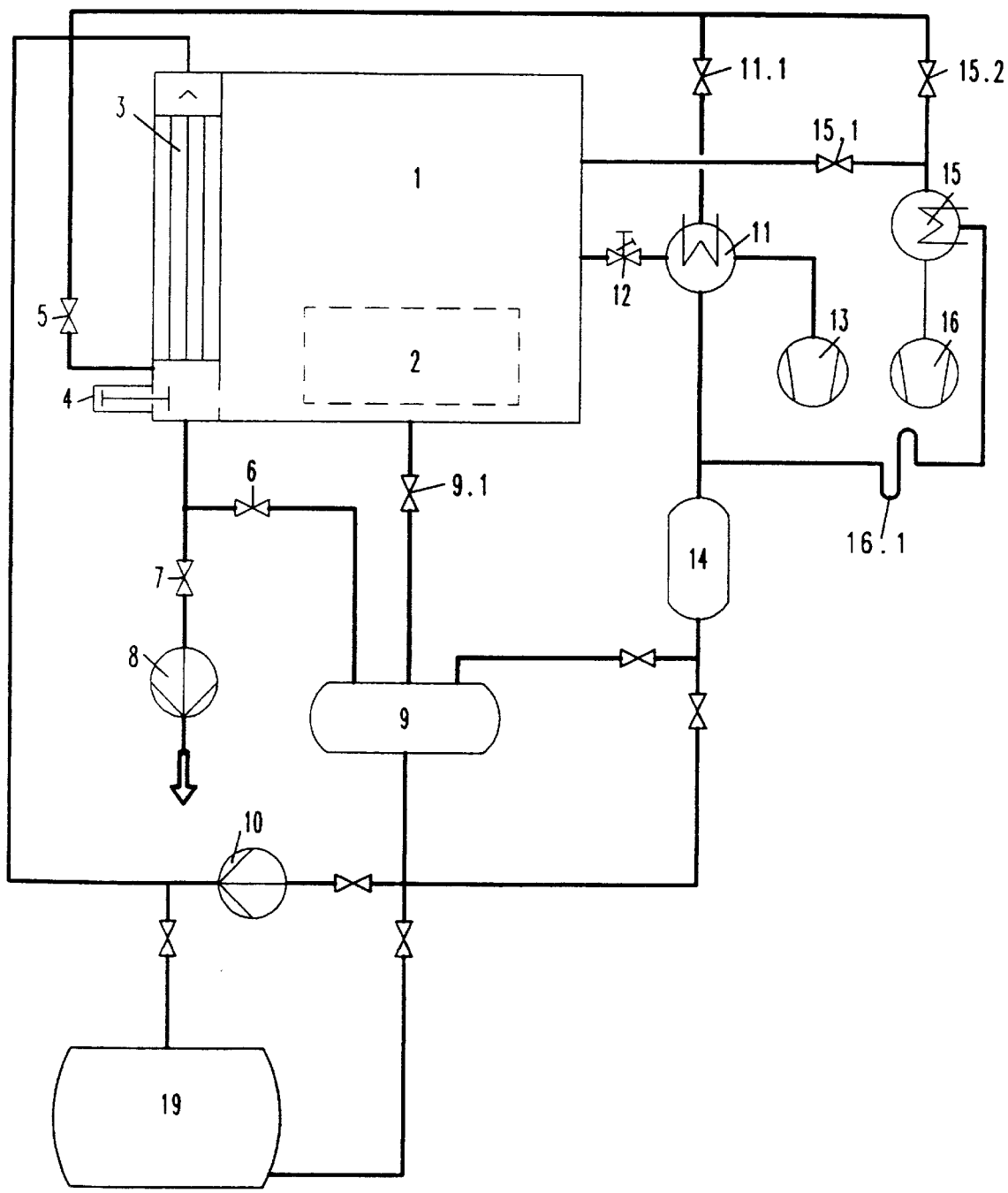
FIG. 2 shows another embodiment of heating and drying equipment.

FIG. 2 shows another embodiment of the equipment of the invention wherein the same references denote the same components as in FIG. 1. Contrary to the embodiment of FIG. 1, a tapping line with a valve 11.1 is present between the first condenser 11 and the bypass line, that is the connection line between the valve 5 and the second condenser 15. Furthermore, the check valve 15.2 is present in the bypass line in front of the second condenser 15. As a result distillation by means of the condenser 11 with hooked-up vacuum pump 13 is possible during the fine-drying operation, valve 11.1 being open and valve 15.2 being closed. Thereby oil and kerosene can also be separated during fine drying.

Figure 3:
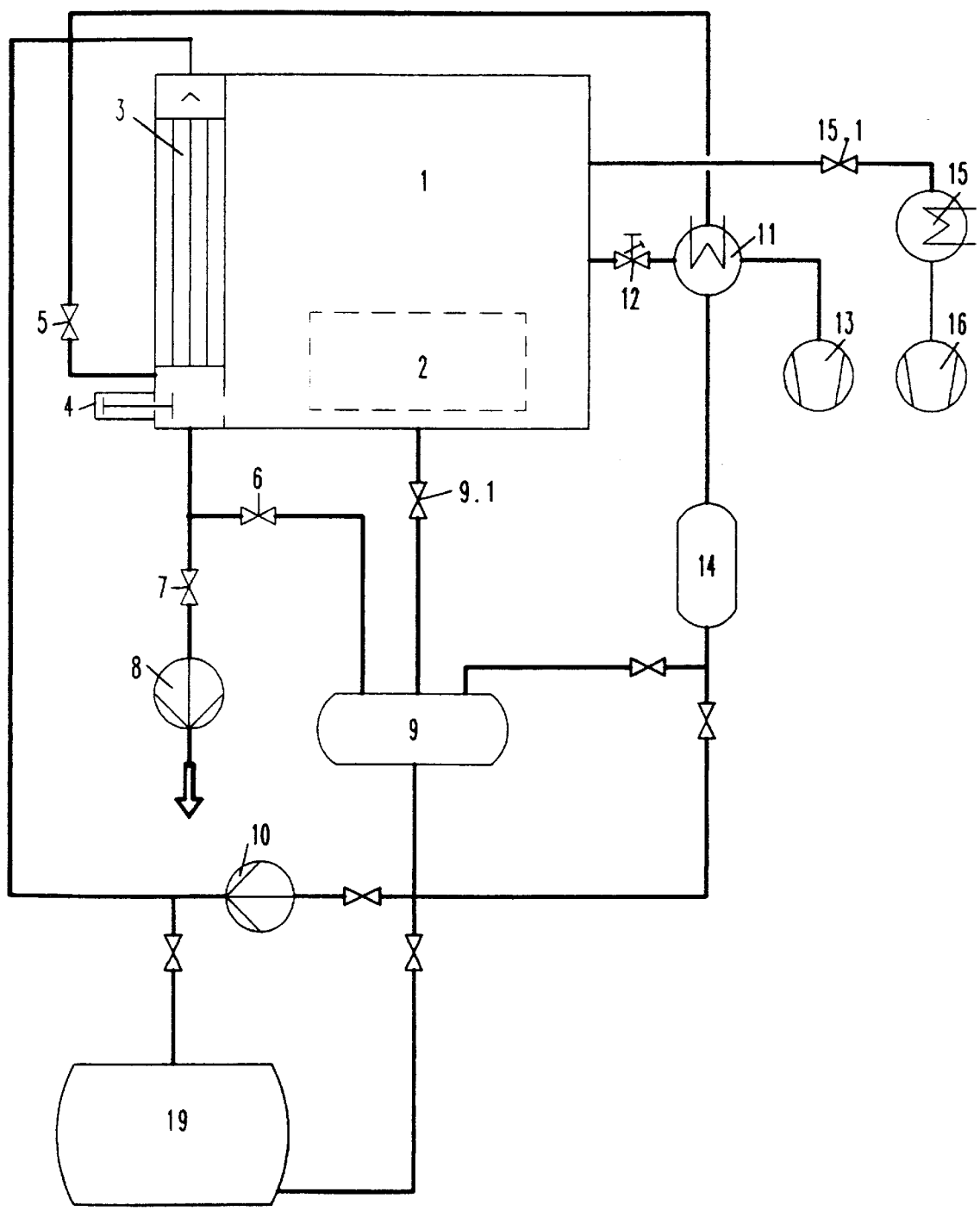
FIG. 3 is a simplified heating and drying equipment.

FIG. 3 shows an embodiment that is simpler than those of FIGS. 1 and 2. Contrary to the case of the embodiment of FIG. 1, condensation of evaporated heating medium in the distillation stage takes place by means of the condenser 11, further pressurization in the drying vessel 1 taking place by means of the vacuum pump 16 with condenser 15 and the valve 15.1. This embodiment also allows using the advantage of the invention, namely parallel operation without prohibitive equipment costs.

Figure 4:
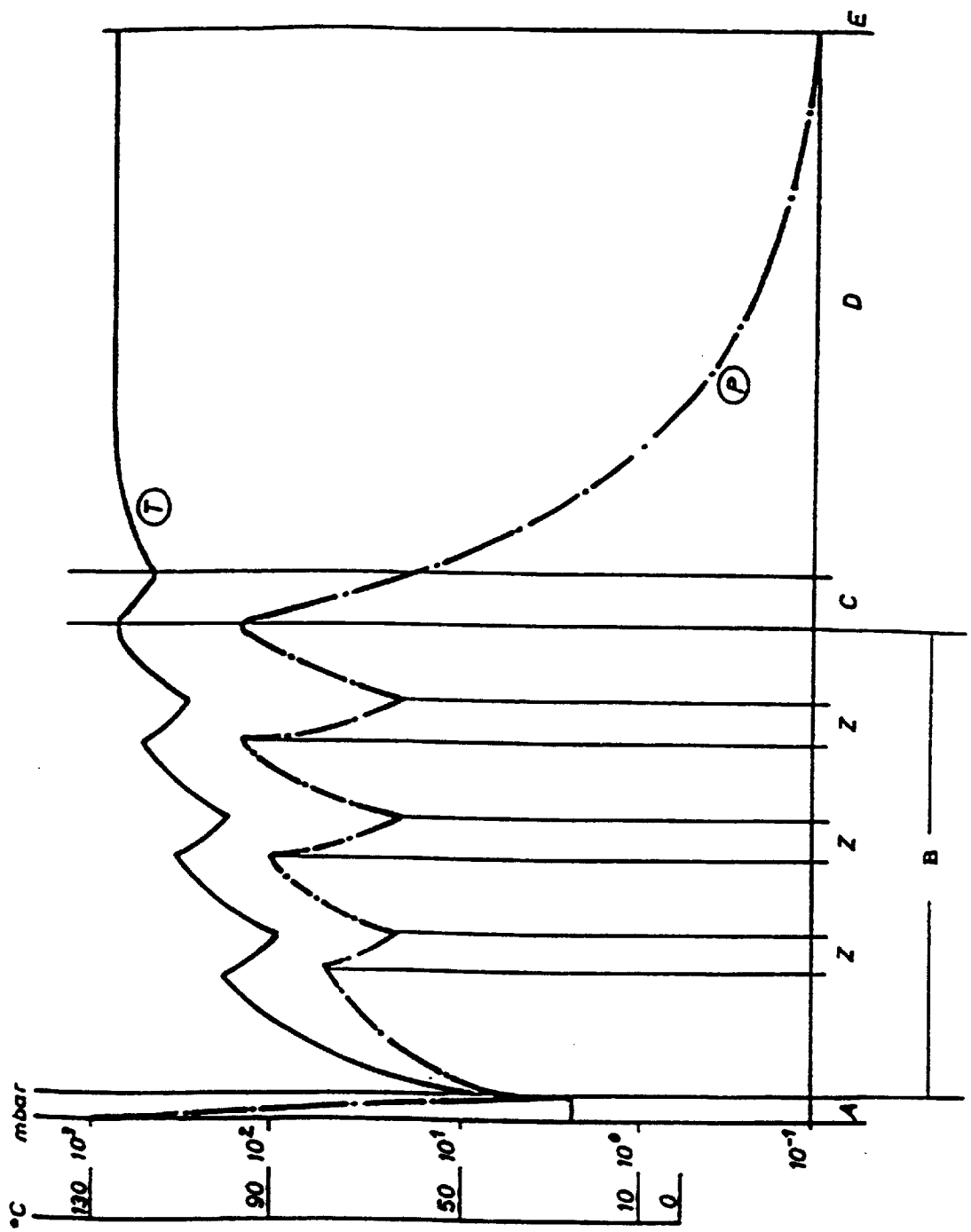
FIG. 4 shows the temperature and pressure functions in the vacuum vessel during heating and drying.

FIG. 4 shows the temperature and pressure functions during heating and drying when using equipment of the invention. The temperature function is denoted by reference 'T', and the pressure function is dented by reference 'P'. The particular stages of the method are denoted as:

| | |
|---|---|
| A | getting ready to carry out the method |
| B | heating |
| C | definitive lowering of pressure |
| D | fine drying |
| E | removing the part to be dried |
| Z | intermediate pressure drops. |

The vacuum vessel 1 is evacuated to the required operational pressure in the range A. Heating by condensing the kerosene on the parts 2 to be heated takes place in the range B, intermediate pressure-dropping phases Z being used to improve moisture removal. The evaporator 3 not being required for the method proper during these intermediate pressure-dropping phases Z, the oil may be separated from the kerosene during these time intervals.

The evaporator no longer being needed from the beginning of the C stage of pressure drop, this evaporator, as already discussed above, can also be used during the pressure-dropping phase C and the medium-vacuum stage D (fine drying) to separate the oil from the kerosene as discussed above for the equipment of FIG. 2.

While present invention has been shown and described with reference to the specific embodiments and the accompanying drawings, it will be understood by those of skill in the art that various changes in form and detail may be made therein without departing from the spirit and scope of the present invention.

What is claimed is:

1. Equipment for vacuum-heating and vacuum-drying parts (2) fitted with hydroscopic, electrical insulation comprising one of cellulose and plastic, using the heat of condensation of a heating-medium vapor, at least one second liquid of higher boiling point being collected from the parts (2) during heating, and forming a solution with the heating liquid, comprising:

an evacuable vacuum vessel (1), a vacuum pump (13) preceded by a condenser (11) and an evaporator (3) for the heating liquid, the evaporator (3) being connected by means of a sealable aperture to the vacuum vessel (1) and through a bypass line directly to a second condenser (15) whereby the second condenser (15) is connected downstream to the bypass line so that the first condenser (11) may remain connected to the vacuum vessel (1) while the heating medium is cleansed by means of the bypass line and the second condenser (15).

2. Equipment as claimed in claim 1, wherein the second condenser (15) used for the distillation stage is connected by a pressure barrier (16.1) to one of a bypass line, a liquid reservoir/separation vessel (14).

3. Equipment as claimed in claim 1, further comprising a tapping line between the first condenser (11) and a connecting line used when distilling to the second condenser (15).

4. Equipment as claimed in claim 3, further comprising a valve (11.1) in the tapping line.

5. Equipment as claimed in claim 1, wherein said parts (2) fitted with hygroscopic, electrical insulation comprise at least one of transformers, capacitors, measurement transducers and current feedthroughs.

6. Equipment for vacuum-heating and vacuum-drying parts (2) fitted with hydroscopic, electrical insulation comprising one of cellulose and plastic, using the heat of condensation of a heating-medium vapor, at least one second liquid of higher boiling point being collected from the parts (2) during heating, and forming a solution with the heating liquid, comprising:

an evacuable vacuum vessel (1);

an evaporator (3) connected to said vessel (1) by means of a sealable aperture;

a vacuum pump (13) connected to a first condenser (11) used to heat and dry said parts which is turn connected to said vessel (1);

said evaporator (3) being connected to said first condenser by means of a bypass line;

a second condenser (15) used for distilling said medium, said second condenser being connected to said evaporator (3) via a valve (5);

a liquid reservoir/separation vessel (14) disposed between said evaporator and each of said first condenser (11) and said second condenser (15); and a second pump (10) disposed between said evaporator and said liquid reservoir/separation vessel (14);

wherein said evaporator (3), said valve (5), said second condenser (15), and said liquid reservoir/separation vessel (14), all form part of a closed circuit and said second condenser (15) is capable of distilling said heating medium simultaneously while said first condenser heats and dries said parts.

* * * * *

UNITED STATES PATENT AND TRADEMARK OFFICE
CERTIFICATE OF CORRECTION

PATENT NO. : 6,108,927
DATED : August 29, 2000
INVENTOR(S) : Helmut Strzala

It is certified that error appears in the above-indentified patent and that said Letters Patent is hereby corrected as shown below:

On the front page, line [73], replace "Wilhelm Hendrich" with --Wilhelm Hedrich--;

line [73], replace "Ehringshausen-Datzenfurt" with --D-35630 Ehringshausen-Katzenfurt--.

Signed and Sealed this

Twenty-fourth Day of April, 2001

Attest:

NICHOLAS P. GODICI

Attesting Officer

Acting Director of the United States Patent and Trademark Office